United States Patent Office.

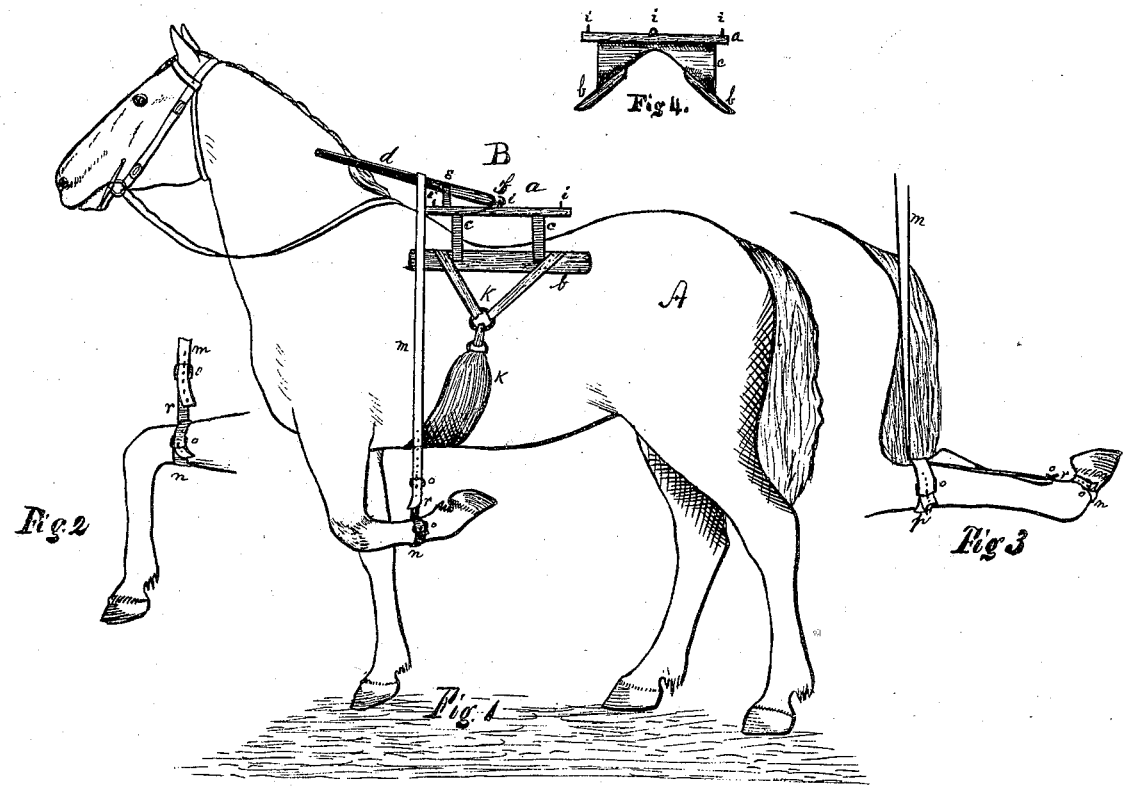

THOMAS C. WILLIAMS, OF WARRENTON, MISSOURI.

Letters Patent No. 113,379, dated April 4, 1871.

IMPROVEMENT IN FOOT-LIFTERS FOR BLACKSMITHS.

The Schedule referred to in these Letters Patent and making part of the same.

I, THOMAS C. WILLIAMS, of Warrenton, Warren county, State of Missouri, have invented a certain Machine, of which the following is a specification.

Nature and Objects of the Invention.

My invention relates to the combination of a saddle-bar and straps in such a manner that when placed on a horse or other animal he may be shod by a smith without holding any part of the weight of the animal, but makes the animal support himself; that any ugly, vicious, or scary animal cannot get one of his feet on the ground; and as no animal will act ugly while on only three of his feet, he will quietly submit to the smith while being shod.

Description of the Accompanying Drawing.

Figure 1 is a side view of my machine when a shoe is to be put on the fore-foot.

Figure 2 is a view of the fore-foot when the front part of the fore-foot is to be trimmed.

Figure 3 is a view of the hind foot when a shoe is to be put upon it.

Figure 4 is an end view of the saddle.

General Description.

A is a horse.

B is the saddle, which should be substantially constructed.

*a* is the saddle-top, and is similar to the top of a center-table, and is firmly secured to the bridge-pieces *c c*.

*b b* are pads, and are also firmly secured to the pieces *c c*.

*k* is the band, which passes under the animal and secures the saddle firmly upon his back.

*d* is a bar, with a hook, *f*, at one end thereof.

*e* is a fulcrum, which may slide up and down the bar *d*.

*i i i* are staples on the saddle-top *a*, to which the hook *f* is attached.

*o o o* are buckles on the straps.

*m* is a long strap, with a loop at the upper end, through which the bar *d* passes, and the lower end of the strap passes through or is fastened to the buckle *o*, so that the animal's foot may be raised to any desired height.

*n* is a strap, which is fastened around the leg of the animal by the buckle *o*, and has a short strap, *r*, fastened to the side of the strap *n*, which short strap *r* has a buckle, *o*, on the end.

*p* is a strap, used in shoeing the hind feet, and is fastened just above the hock.

The strap *n* is fastened just above the hoof, and the strap *m* is fastened to it, and passes under the strap and holds the bottom of the foot turned up ready for the workman.

When an animal is to be shod, the saddle B is secured upon his back, the strap *n* is fastened just above the fetlock of the fore-leg, the foot is raised to the proper height, and is then held there by the strap *m*, attached to the straps *r* and *n* by the buckle *o*.

When the front part of the foot is to be trimmed, the strap *n* is fastened to the fore-leg above the knee, and the foot is raised and held at the proper height in the same manner as before described.

When the hind foot is to be shod, the strap *n* is fastened just above the hoof, and the strap *p* is fastened just above the hock, the strap *m* passes under *p*, and is secured to the straps *r* and *n* by *o*, and the foot is raised and held at the height desired by the straps, as before set forth.

Claims.

I claim as my invention—

1. The combination of the saddle B and the bar *d*, and the straps *m*, *n*, and *r*, with buckles *o*, substantially as and for the purposes hereinbefore set forth.

2. The combination of the saddle B and the bar *d*, and the straps *m*, *n*, and *r* and *p*, with the buckles *o*, substantially as and for the purposes hereinbefore set forth.

THOMAS C. WILLIAMS.

Witnesses:
CHARLEY WILLIAMS,
W. A. JONES.